United States Patent Office 3,462,257
Patented Aug. 19, 1969

3,462,257
TURF MANAGEMENT WITH AZAURACILS PLUS FERTILIZER
George R. McVey, John A. Long, and Richard J. Timmons, Marysville, Ohio, assignors to The O. M. Scott & Sons Company, Marysville, Ohio, a corporation of Ohio
Filed Sept. 13, 1965, Ser. No. 486,810
Int. Cl. A01n 21/00; C05g 3/00; A01c 21/00
U.S. Cl. 71—76                                16 Claims

ABSTRACT OF THE DISCLOSURE

The production of high quality turfs having low rates of vertical growth by the co-ordinated application of fertilizers containing nitrogen in plant available form and 6-azauracil or a derivative or salt thereof to the turf.

---

This invention relates to the regulation of plant growth and, more specifically, to the production of slower growing turfs of higher quality by the combined application of plant nutrients and 6-azauracil and derivatives and salts thereof to the turf.

One of the major drawbacks in maintaining a lawn or other turf area is that the turf must be mowed and the clippings removed at frequent intervals. This may become an onerous burden; and it has, therefore, long been recognized that it would be highly desirable to be able to retard vertical growth of turf without detracting from the quality of the turf in order to reduce the mowing interval.

Numerous compounds have heretofore been tested for their inhibitory effect on various types of plant growth. These include nicotiniums, quaternary ammonium carbamates, Phosfon (2,4-dichlorobenzyltributylphosphonium chloride), CCC [(2-chloroethyl)trimethylammonium chloride], maleic hydrazide, C–011 (N-dimethylaminomaleamic acid), succinamic acid, and Hadacidin (N-formylhydroxyaminoacetic acid). None of these, however, have proved satisfactory for turfs. Typical defects that they display are: ineffectiveness for turf species; discoloration and injury to turf; reduction of turf density; short-lived activity; comparative difficulty of application; extreme phytotoxicity when applied at rates only slightly above those required to inhibit plant growth; and counteraction by fertilizer applied to minimize their adverse effects.

Another plant growth regulator which has heretofore been investigated is 6-azauracil. This compound was found to effectively retard plant growth by Z. Sormova et al. who reported their findings in an article entitled "Some Pyrimidine Derivatives as New Types of Plant Stimulants" in Coll. Czech. Chem. Comm. 25, pp. 2889–2898. Substantiating findings were later published in United States Patent No. 3,116,994 issued Jan. 7, 1964, to A. M. Goenaga.

The early investigations of Sormova et al. and Goenaga were limited to testing the effect of 6-azauracil on plants such as peas, beans, cucumbers, wheat, and the like; and there is no suggestion in their published findings that this compound is an effective inhibitor of the vertical growth of turf species. Moreover, Goenaga found, in some cases, that 6-azauracil caused burning and otherwise adversely affected plant development, which would indicate that this compound is unsuitable for regulating the vertical growth of turfs. Now, however, it has surprisingly been found that 6-azauracil, unlike other of the plant growth regulators listed above, will effectively retard the growth of turf species as well as the types of plant growth on which it was previously tested.

Even more unexpectedly, it has now been found that the effectiveness and usefulness of 6-azauracil as a plant growth regulator can be greatly increased and its adverse effects on plants eliminated by applying it in combination with nitrogen fertilizers and other essential plant nutrients to turf, or by applying it to a turf which has previously been enriched with nitrogen containing fertilizers.

Among the advantages of this combination of 6-azauracil and available nitrogen over 6-azauracil by itself and over other plant growth regulators, alone or in combination with fertilizers, are: (1) effectiveness on turf species; (2) the production of turf of a quality which is superior to that obtained by using either a plant growth regulator or fertilizer alone; (3) a marked reduction in mowing frequency and clippings; (4) increased lateral development of plants by tillering, resulting in an increase in turf density; (5) improvement in turf color, resulting in turf having a fresh, lush appearance; (6) reduction in moisture requirements; (7) uniform recovery from the treatment with no loss of aesthetic value; (8) reduction in the amount of fertilizer required to maintain good turf color; and (9) effectiveness on a wide variety of turf grass species. Other advantages of this combination, not possessed by plant growth regulating substances heretofore known, are: (1) long duration of activity; (2) only small quantities of growth regulator and fertilizer are needed; (3) repeat applications do not have an adverse effect on turfs; (4) effectiveness in different geographical areas; (5) pre-emergence control of certain weeds; and (6) lack of criticality in the method and rate of application.

It has also been found that the foregoing advantages may be realized by employing instead of 6-azauracil a derivative or salt of this compound. Examples are:

4-thio-6-azauracil,
2-thio-6-azauracil,
6-azauracil sodium salt,
2-thio-6-azauracil sodium salt,
3-methyl-6-azauracil,
5-bromo-6-azauracil,
5-methyl-2-thio-6-azauracil,
or 5-phenyl-2-thio-6-azauracil.

In general, compounds have the following formula are are useful in the practice of the present invention:

in which R is either oxygen or sulfur, $R_1$ is sodium, hydrogen or methyl, $R_2$ is either oxygen or sulfur, and $R_3$ is hydrogen, bromine, methyl or phenyl.

From the foregoing, it will be apparent that one important object of the present invention is the provision of methods and compositions for altering the morphological characteristics of turf so as to maintain it at peak quality levels and, at the same time, substantially reduce mowing and clipping removal requirements.

A further important object of this invention is to provide novel methods of and compositions for treating turfs that will produce improved turf color, quality, and tiller development with an associated reduction in the rate of upright shoot growth.

Another important object of this invention is to provide novel methods and compositions in accord with the foregoing objects which are capable of pre-emergence control of certain lawn weeds.

Yet another important object of this invention is to provide novel methods of and compositions for developing turfs of higher quality than are attainable by fertilizers alone.

Still another important object of this invention is to provide novel methods of and compositions for reducing the mowing frequency of a broad range of turf species in mixed turf compositions and in single selection plantings which are independent of environmental factors.

Yet another important object of this invention is the provision of novel compositions in accord with the preceding objects which have a wide margin between desirable turf response and objectionable turf phytotoxicity.

A further important object of this invention is to provide novel compositions in accord with the preceding objects which are effective whether they are applied to moist or dry foliage or to actively growing or dormant turf.

Another important object of this invention is to provide novel methods of and compositions for effecting increases in the protein content of plants.

Still another object of the present invention is the provision of methods and compositions in accord with the preceding objects, which:

(1) Will not cause discoloration of or injury to turf;
(2) Will promote tillering and thereby increase lateral growth to provide more dense turfs;
(3) Will reduce fertilizer and moisture requirements;
(4) Will remain active for longer periods than prior art compositions;
(5) Can be applied at lower rates; and
(6) Can be used repeatedly.

Another important and specific object of the present invention is the provision of novel methods for producing turfs of improved quality and slower vertical growth by applying to the turf synergistic combinations of plant nutrients and compounds of the formula wherein R is oxygen or sulfur; $R_1$ is sodium, hydrogen, or methyl; $R_2$ is oxygen or sulfur; and $R_3$ is hydrogen, bromine, methyl, or phenyl.

Further objects, additional advantages, and other novel features of the present invention will become apparent from the appended claims and as the ensuing detailed discussion and description of the present invention proceeds with reference to the accompanying drawing, in which:

In the practice of the present invention, the plant growth inhibitor-plant nutrient combination is preferably applied at rates providing 0.1 to 12 pounds per acre of the growth regulator and up to 4 pounds of nitrogen per 1000 square feet supplied from either an organic or inorganic source, the precise nature of the fertilizer being of no consequence in the practice of the present invention. The active ingredients may be applied by a foliar spray or combined with a solid carrier and spread on the area to be treated, and the active ingredients may be combined in a single formulation or applied separately, either at the same or at different times. The duration of the activity of the combination ranges from four to eight weeks or longer, depending upon the rate of application of the active ingredients and whether they are applied separately or in a single formulation.

A fuller appreciation of the details of the novel methods and compositions of the present invention may be gained from the examples which follow. These have been grouped under headings indicative of the aspects of the present invention which they illustrate.

TURF QUALITY

As mentioned above, one of the important advantages of the present invention is that the combined application of 6-azauracil and nitrogen containing fertilizer produces turf of a markedly higher quality than the application of either fertilizer or 6-azauracil by itself. This important aspect of the invention is illustrated by the following examples, which also show that a combined application of 6-azauracil and nitrogen containing fertilizer enhances turf quality more than separate applications of those ingredients.

Example I

To demonstrate the advantages of a combined 6-azauracil-fertilizer composition over separate applications of 6-azauracil and fertilizer and that both combined and separate applications are superior to fertilizer by itself in improving the color, density, and quality of turf, Classic® bluegrass was treated with formulations containing 6-azauracil in combination with nitrogen, phosphorus and potassium (4–1–1 N, $P_2O_5$ and $K_2O$ ratio), with separate formulations applied at a comparable rate of 6-azauracil and nitrogen, phosphorus and potassium, and with comparable rates of nitrogen-absent 6-azauracil. The formulations (F–1742 and F–2030 described hereinafter) were applied in the Spring to dry foliage.

The results obtained with respect to turf color, density, injury, and quality are shown in the following table (observations were made either 23 or 59 days after application):

| 6-azauracil, lbs./acre | Nitrogen, lbs./1,000 sq. ft. | Application [d] | Color [b] | Density [b] | Injury | Quality [e] |
|---|---|---|---|---|---|---|
| 0 [a] | 0 [a] |   | 100 [a] | 100 [a] | 0 [a] | 200 [a] |
| 0 | 2 | S [d] | 150 | 135 | 0 | 285 |
| 2 | 2 | S [d] | 145 | 140 | 0 | 285 |
| 2 | 2 | C [d] | 161 [c] | 145 | 0 | 306 |
| LSD,[f] 5% |   |   | 9.3 | 8.7 | NS |   |
| LSD,[f] 1% |   |   | 12.5 | 11.6 | NS |   |

[a] Control.
[b] Values given in percent of the zero level of 6-azauracil and nitrogen.
[c] Significantly different at the 5% level from a comparable rate of 6-azauracil and fertilizer applied on separate carriers.
[d] 6-azauracil and fertilizer formulated on separate carriers (S) or on the same carrier (C).
[e] Quality based on color plus density minus injury.
[f] Least significant difference.

The foregoing table shows that a combination of 6-azauracil and nitrogen fertilizer is far more effective than the fertilizer by itself in improving turf color, density, and quality. The data also shows that a combined 6-azauracil-nitrogen fertilizer formulation is superior in this respect to the same ingredients applied by way of separate formulations.

Example II

To show that the beneficial effect of the compositions of the present invention with respect to turf color, density, and quality may be obtained on various types of turfs, sods of Classic® bluegrass, K-31 tall fescue, and Bitterblue St. Augustine grass were treated with 6-azauracil at a rate of 2 pounds per acre as a foliar spray or as a soil drench. Tifgreen Bermuda was treated with 6-azauracil at a rate of 0.1 pound per acre as a foliar spray. The sod was fertilized at the same time at the rate of 1.8 pounds of nitrogen per 1000 square feet.

The soil drench was a solution consisting of 0.5 ml. of Tween 20 (Tweens are polyoxyalkylene derivatives of sorbitan monolaurate), 1.67 ml. of acetone, and 97.83 ml. of distilled water per 100 ml. of drench plus either no or sufficient chemical to provide two pounds per acre. The foliar spray consisted of 0.05 ml. of Tween 20, 0.167 ml. of acetone, and 9.783 ml. of distilled water per 10 ml. plus no chemical or sufficient chemical to provide either 0.1 or 2 pounds per acre. The plants were treated with a granular fertilizer (1.8 pounds of nitrogen from urea formaldehyde, 0.55 pound of $P_2O_5$, and 0.55 pound of $K_2O$ per 1000 square feet) on the same day that the 6-azauracil was applied.

Observations were made five weeks after the application of the fertilizer and 6-azauracil.

The results obtained are shown in the following table:

The results of these tests are tabulated below:

| | Turf Color [a] | | | |
|---|---|---|---|---|
| Rate of 6-azauracil, pounds per acre | 0 | 1 | 2 | 4 |
| Classic® bluegrass | 100 | 116 | 116 | 109 |
| Astoria bentgrass | 100 | 121 | 116 | 113 |
| Chewings red fescue | 100 | 114 | 132 | 109 |

[a] Recorded 85 days and 50 days after the first and second treatments, espectively. Values are given in percentage of zero level of 6-azauracil.

The foregoing data shows that the color of Classic® bluegrass, Astoria bentgrass, and Chewings fescue turf is improved to a much greater extent by treating it as disclosed herein with nitrogen containing fertilizer and from 1 through 4 pounds per acre of 6-azauracil than by the application of fertilizer alone. The foregoing tests also establish that the present invention is applicable to turf species other than those listed in Example II and that application of the fertilizer and 6-azauracil by granular applicator is effective.

Example IV

To demonstrate the effect of varying the rates of application of nitrogen containing fertilizers and 6-azaura-

| | | Observations | | | |
|---|---|---|---|---|---|
| Turf Species | 6-azauracil Rate, lbs. per acre | Method of Appl.[a] | Percent Turf Injury | Percent Turf Color [b] | Percent Turf Density [b] | Turf Quality [c] |
| Classic® bluegrass | 0 | SD | 0 | 100 | 100 | 200 |
| | 2 | SD | 2 | 167 | 146 | 311 |
| K-31 tall fescue | 0 | SD | 2 | 100 | 100 | 198 |
| | 2 | SD | 2 | 114 | 104 | 216 |
| Tifgreen Bermuda | 0 | FS | 0 | 100 | 100 | 200 |
| | 0.1 | FS | 0 | 114 | 115 | 229 |
| Bitterblue St. Augustine | 0 | FS | 0 | 100 | 100 | 200 |
| | 2 | FS | 3 | 143 | 95 | 235 |

[a] SD equals soil drench; FS equals foliage spray.
[b] Values are given in percentage of the zero level of 6-azauracil. Percent improvement is indicated by values over 100%; i.e., 167% denotes a 67% improvement.
[c] Based on turf density plus turf color minus turf injury.

The data shows that turf quality was improved for all species studied wtih Classic® bluegrass exhibiting the greatest response and K-31 tall fescue the least response after five weeks. The data further shows that foliar sprays and soil drenches are both effective modes of application.

Example III

To show that application of the fertilizer and 6-azauracil in granular form is similarly effective on a variety of turf species and to show that the invention is applicable to turf species other than those of Example II, plots of established turfs of Classic® bluegrass, Astoria bentgrass and Chewings red fescue were fertilized with the equivalent of 1.8 and 0.9 pounds of nitrogen per 1000 square feet in two applications 35 days apart using Turf Builder® (23-7-7 ratio of N, $P_2O_5$, and $K_2O$) as a source of plant nutrients (Turf Builder® is a urea-formaldehyde fertilizer having a high nitrogen availability index manufactured in accord with the teachings of U.S. Patent No. 3,076,700). 6-azauracil was applied on the same dates as the fertilizer to dry foliage using a formulation (F-1742) composed of vermiculite (89.407%), acetone (5.013%), hexylene glycol (3.249%), Tween 20 (.449%) and 6-azauracil (1.832%). The materials were applied with a granular applicator to deliver the equivalent of 0, 1, 2, and 4 pounds per acre of 6-azauracil. Readings were recorded 85 days after the initial application of Turf Builder® and 6-azauracil.

cil, established Classic® bluegrass turf was fertilized with the equivalent of 0, 0.45, 0.9, and 1.8 pounds of nitrogen per 1000 square feet by the application of Turf Builder® (23-7-7 ratio of N, $P_2O_5$, and $K_2O$) in all possible combinations with 6-azauracil applied at 0, 1, 2 and 4 pounds per acre using a formulation (F-1742) consisting of vermiculite (89.407%), acetone (5.013%), hexylene glycol (3.249%), Tween 20 (.499%), and 6-azauracil (1.832%). The Turf Builder® and the 6-azauracil were applied with a granular applicator. Readings were recorded 37 days after the application.

The results were as follows:

| Pounds of 6-azauracil per acre | Pounds of Nitrogen per 1,000 sq. ft. | Percent Turf Color [a] | Percent Turf Density [a] | Percent Turf Injury | Turf Quality [b] |
|---|---|---|---|---|---|
| 0 | 0.0 | 100 | 100 | 0 | 200 |
| 1 | 0.0 | 100 | 100 | 0 | 200 |
| 4 | 0.0 | 100 | 100 | 0 | 200 |
| 0 | 0.45 | 100 | 100 | 0 | 200 |
| 1 | 0.45 | 114 | 113 | 0 | 227 |
| 4 | 0.45 | 114 | 113 | 0 | 227 |
| 0 | 0.90 | 100 | 100 | 0 | 200 |
| 1 | 0.90 | 100 | 113 | 0 | 213 |
| 4 | 0.90 | 113 | 125 | 0 | 238 |
| 0 | 1.80 | 100 | 100 | 0 | 200 |
| 1 | 1.80 | 113 | 89 | 0 | 202 |
| 4 | 1.80 | 125 | 111 | 0 | 236 |

[a] Values are given in percentages based on equal rates of fertilizers at the zero level of 6-azauracil.
[b] Quality based on turf density plus turf color minus injury.

This data shows the synergistic effect of nitrogen fertilizer and 6-azauracil. The latter, applied by itself, resulted in no improvement in turf color, density, or quality even at rates of 4.0 pounds per acre.

Example V

The benefits of the present invention may be reaped by maintaining turf on a high fertility program and then treating with 6-azauracil as well as by applying these materials at the same time. This is demonstrated by tests in which bluegrass plugs were removed from established turf and placed in plastic pots in the greenhouse. The plugs were maintained on a high fertility program by fertilizing them weekly with 50 ml. of standards Hoagland solution No. 1, a solution containing all the elements essential for plant growth, which has the following composition:

| Ingredient: | Parts per million |
|---|---|
| N | 210 |
| P | 31 |
| K | 235 |
| Ca | 200 |
| Mg | 49 |
| $SO_4$ | 192 |
| Fe | .5 |
| Mn | .5 |
| B | .5 |
| Cu | .02 |
| Zn | .05 |
| Mo | .01 |

6-azauracil was applied to the plants at the equivalent of 6 and 12 pounds per acre using a granular formulation (same as F–1742) composed of vermiculite (89.407%), acetone (5.013%), hexylene glycol (3.249%), Tween 20 (.499%) and 6-azauracil (1.832%). The materials were applied manually on moist foliage and misted a day later to simulate a dew.

Observations were made for injury 30 days and for color and density 45 days after the 6-azauracil was applied:

| | | Observations | | | |
|---|---|---|---|---|---|
| Turf Species | 6-azauracil, lbs. per acre | Percent Turf Color [a] | Percent Turf Density [a] | Percent Turf Injury | Turf Quality [b] |
| Common Kentucky bluegrass | 0 | 100 | 100 | 1 | 199 |
|  | 6 | 150 | 114 | 5 | 259 |
|  | 12 | 167 | 114 | 10 | 271 |
| Merion bluegrass | 0 | 100 | 100 | 0 | 200 |
|  | 6 | 143 | 150 | 0 | 293 |
|  | 12 | 143 | 133 | 3 | 273 |
| Classic® bluegrass | 0 | 100 | 100 | 1 | 199 |
|  | 6 | 167 | 133 | 1 | 299 |
|  | 12 | 150 | 117 | 5 | 262 |

[a] Based on zero level of 6-azauracil.
[b] Based on turf color plus turf density minus turf injury.

These tests establish that, as discussed above, 6-azauracil can be utilized to improve the quality of turfs which have been maintained on a high fertility program by the periodic application of nitrogen containing fertilizer. They also show that the 6-azauracil can be applied to moist as well as dry foliage to obtain the improvements in turf color, density, and quality contemplated by the present invention.

MOWING FREQUENCY, CLIPPING REMOVAL, HEIGHT GROWTH RESPONSE AND RESIDUAL

In the previous section it was shown that marked improvements in turf color, density, and quality can be obtained by treating the turf with a combination of nitrogen containing fertilizer and 6-azauracil. Treatment of turf with this combination of ingredients also has the additional important advantage that it reduces the vertical growth of the turf, thereby reducing the frequency of mowing and the quality of clippings which must be removed. This is a surprising result because it has heretofore been found that the combination of fertilizer with other plant growth regulators nullified the growth inhibiting effect of the latter (see Crafts et al., Some Studies on the Herbicidal Properties of Maleic Hydrazide, Hilgardia, Vol. 27, No. 22 (1958), pp. 723–757 and Cabler et al., Chemical Growth Retardants for Turf Grasses, The Golf Course Reporter, January 1963 pp. 35–44).

This important and unexpected result is shown by following examples.

Example VI

To demonstrate turf response to a combination of nitrogen containing fertilizer and 6-azauracil, Classic® bluegrass turf was treated in the field with fertilizer (23–7–7 ratio of N, $P_2O_5$, and $K_2O$) manufactured in accord with the teachings of U.S. Patent No. 3,076,700 and 6-azauracil in separate applications and in applications where the nitrogen containing fertilizer and 6-azauracil were combined physically in the same granule. The 6-azauracil formulations employed were Nos. F–1742 and F–2030, the latter of which contains both 6-azauracil and fertilizer. Materials were applied with a granular applicator to dry foliage. Rates of fertilizer and 6-azauracil were varied to give the equivalent of 1 and 2 pounds per 1000 sq. ft. of nitrogen and 1 and 2 pounds per acre of 6-azauracil.

The data obtained is tabulated below:

| Treatment | | Turf Response | | | |
|---|---|---|---|---|---|
| 6-azauracil, lbs. per acre | Nitrogen, lbs. per 1,000 sq. ft. | Upright leaves and stems removed [a] | Percent reduction leaves and stems removed [e] | Height leaves and stems from ground level (mms.) | Percent reduction of plant height [e] |
| 0 | 0 | 4.17 | 0 | 71.7 | 0 |
| 1 | 0 | 2.67 | 36 | 68.7 | 4 |
| 0 | 1 | 5.83 | 0 | 81.7 | 0 |
| 1 | 1 S [b] | 3.83 | 34 | 73.3 | 10 |
| 1 | 1 C [c] | 2.00 | 66 | 59.3 | 27 |
| 0 | 2 | 7.17 | 0 | 93.3 | 0 |
| 2 | 2 S | 2.17 | 70 | 63.3 | 32 |
| 2 | 2 C | 1.00 | 86 | 51.0 | 45 |
| LSD,[d] 5% | | 1.20 | | 8.2 | |
| LSD,[d] 1% | | 1.60 | | 10.9 | |

[a] Grams of dry stems and leaves removed above a 2-inch mowing height from a 2.66 sq. ft area.
[b] S designates that 6-azauracil and fertilizer were formulated on separate carriers.
[c] Designates that 6-azauracil and fertilizers were formulated on the same carrier.
[d] Least significant difference.
[f] Based on zero level of 6-azauracil and equal rates of nitrogen.

As shown by the foregoing, applying nitrogen fertilizer to turf in combination with 6-azauracil does not significantly reduce the vertical growth inhibiting properties of the latter even when the fertilizer and 6-azauracil are applied separately. When they are combined on or in the same carrier and applied simultaneously, there is a marked enhancement in the vertical growth inhibiting properties of the 6-azauracil.

Example VII

To compare the nullifying effect of fertilizer on maleic hydrazide, the most promising growth retardant for turfs heretofore known, to the synergistic effect of fertilizer on 6-azauracil, Classic® bluegrass turf maintained on a high fertility program of 5.4 pounds of N, 1.64 pounds of $P_2O_5$ and 1.64 pounds of $K_2O$ per 1000 sq. ft. per year was treated with granular formulations of 6-azauracil at the rate of 8 pounds per acre in early May and again approximately five weeks later. To similarly maintained turf, maleic hydrazide was applied twice in a granular formulation at the rate of 8 pounds per acre at approximately the same time of year with about the same interval between applications. All plots were cut at a 1½ inches mowing height when the grass was 2¼–2½ inches high to obtain maximum aesthetic value.

The 6-azauracil treatments produced a dramatic reduction in mowing frequency in comparison to the control (fertilizer only) and maleic hydrazide treatments. From mid-May until late July only one mowing was required to maintain maximum aesthetic value in the plots treated with 6-azauracil. In contrast the control and maleic hydrazide treated plots required 7 to 8 mowings as shown by the following tabulations of the mowing frequency.

Comparable results are obtained when the fertilizer and growth retardant are applied separately or in combined application to turf which has not theretofore been maintained on a high fertility program.

Example VIII

To demonstrate the effectiveness of the present invention in reducing the length of clippings removed from turf treated in accord with the principles of the present invention, established Classic® bluegrass was fertilized with 3.6 pounds of nitrogen per 1000 sq. ft. with a fertilizer having a 4–1–1 ratio of N, $P_2O_5$, and $K_2O$. 6-azauracil was then applied to dry foliage at rates of 2, 4, and 8 pounds per acre. The turf was cut at a 5 cm. mowing height.

The data obtained is summarized in the following table:

| | Length of Clippings Removed (cms.) | | | | | | |
|---|---|---|---|---|---|---|---|
| | Days After Initial Application | | | | | | Total length of clippings removed during test |
| | 0 | 7 | 15 | 21 | 34 | 42 | |
| 6-azauracil, lbs. per acre: | | | | | | | |
| 0 | 0 | 3 | 6 | 8 | 8 | 3 | 28 |
| 2 | 0 | 3 | 1 | 2 | 4 | 3 | 13 |
| 4 | 0 | 3 | 1 | 1 | 3 | 2 | 10 |
| 8 | 0 | 3 | 1 | 1 | 0 | 0 | 5 |

As shown by the foregoing table, inhibition was not evident during the first week after treatment. However, during the following weeks the length of the clippings removed was substantially reduced for 4, 5, and 6 weeks when turf was treated with 2, 4, and 8 pounds per acre of 6-azauracil, respectively.

Example IX

To demonstrate that turf treatment in accord with the present invention reduces the amount of clippings to be removed as well as mowing frequency, 6-azauracil (formulation F-1742) was applied to highly fertilized turf (as described in Example VII) at 2, 4, and 8 pounds per acre. Clippings were then collected and fresh weights determined approximately 1 month after the 6-azauracil was applied.

The clippings removed from plots treated with 6-azauracil were markedly reduced with the greatest response evident at the 2 pound per acre rate of application. Higher rates substantially further reduced the weight of clippings removed, but the response was not proportional to the rates at which the 6-azauracil was applied, as shown by the table below.

| | | Mowing Frequency (No. of Weeks After Treatment) | | | | | | | | | | | | | |
|---|---|---|---|---|---|---|---|---|---|---|---|---|---|---|---|
| Chemical Treatment | Day of Treatment | 1 | 2 | 3 | 4 | 5 | 6 | 7 | 8 | 9 | 10 | 11 | 12 | 13 | 14 |
| 6-azauracil | X [a] | X | | | | | | X | | | | | X | X | X |
| Maleic Hydrazide | X | X | | X | X | X | X | X | | X | | X | X | X | X |
| Control | X | X | X | X | X | X | X | X | | X | | X | X | X | X |

[a] X Denotes mowing.

| Chemical Treatment | Pounds Per Acre | Clipping Fresh Weights, Grams/ 2.66 sq. ft. | Percent Reduction in Clipping Fresh Weights |
|---|---|---|---|
| 6-azauracil | 0 | 68 | 0 |
| | 2 | 46 | 32 |
| | 4 | 30 | 56 |
| | 8 | 17 | 75 |

The foregoing data also shows that the application of nitrogen containing fertilizer to the turf pursuant to the high fertility program has no apparent adverse effect on the growth retarding properties of the 6-azauracil.

Example X

To demonstrate that favorable turf response is also obtained when the nitrogen containing fertilizer and 6-azauracil are applied at the same time, Classic® bluegrass was treated with formulations containing various percentages of 6-azauracil in combination with nitrogen, phosphorus and potassium. The formulations are as follows:

| Formulation No. | F-1745,[a] lbs. per 5,000 sq. ft. | F-2030,[a] lbs. per 5,000 sq. ft. | Percent | F-2031,[a] lbs. per 5,000 sq. ft. | Percent | F-2032,[a] lbs. per 5,000 sq. ft. | Percent |
|---|---|---|---|---|---|---|---|
| 20-5-5 (N, $P_2O_5$ and $K_2O$ Ratio) | 24.00 | 24.37 | 97.41 | 49.02 | 98.05 | 23.93 | 95.73 |
| Hexylene Glycol | 0 | .41 | 1.63 | .61 | 1.22 | .71 | 2.85 |
| Tween 20 | 0 | .13 | .50 | .25 | .50 | .13 | .50 |
| 6-azauracil | 0 | .12 | .46 | .12 | .23 | .23 | .92 |

[a] See method of application and carrier, Example XX.

The above formulations were applied with a granular applicator using single and double applications which resulted in the various rate combinations shown below.

| Formulation Code No. | Chemical Treatment | | Blade Height (cms.) | | | Clipping Dry Weight (gms./ 2.66 sq. ft.) | | |
|---|---|---|---|---|---|---|---|---|
| | 6-azauracil (lb./acre) | Nitrogen (lb./M sq. ft.) | Days After Initial Application | | | | | |
| | | | 28 | 40 | 50 | 28 | 40 | 50 |
| Control | 0 | 0 | 6 | 8 | 6 | 3.0 | 7.4 | 2.0 |
| F-1745 | 0 | 1 | 6 | 8 | 7 | 5.3 | 9.2 | 2.8 |
| F-2030 | 1 | 1 | 4 | 6 | 7 | 1.6 | 8.1 | 2.0 |
| F-2032 | 2 | 1 | 3 | 6 | 5 | 1.5 | 6.3 | 1.7 |
| F-1745 | 0 | 2 | 6 | 9 | 9 | 5.5 | 14.4 | 6.3 |
| F-2031 | 1 | 2 | 5 | 8 | 7 | 2.2 | 12.1 | 2.7 |
| F-2030 | 2 | 2 | 3 | 6 | 6 | 1.4 | 5.8 | 1.8 |
| F-2032 | 4 | 2 | 4 | 6 | 5 | 1.2 | 4.6 | 1.3 |
| F-1745 | 0 | 4 | 7 | 10 | 10 | 6.8 | 20.1 | 9.2 |
| F-2031 | 2 | 4 | 3 | 7 | 7 | 1.3 | 8.1 | 2.7 |

As shown above, when turf is fertilized with 1 to 4 pounds of nitrogen per 1000 square feet in the presence of 1 to 2 pounds of 6-azauracil per acre, the dry weight of clippings removed and the vertical growth are in general comparable to or less than unfertilized plots, again demonstrating that the combination of fertilizer with 6-azauracil has no adverse effects on the growth inhibiting properties of the latter.

Example XI

To further demonstrate the effectiveness of a fertilizer-6-azauracil combination in suppressing vertical plant growth, Classic® bluegrass turf was treated with a granular formulation containing N, $P_2O_5$, and $K_2O$ in a 20-5-5 analysis (97.22%), hexylene glycol (1.805%), Tween 20 (.466%) and 6-azauracil (.508%). This formulation was applied at the rate of 1 pound per acre and .9 pound per 1000 sq. ft. of 6-azauracil and nitrogen and 4 pounds per acre and 3.6 pounds per 1000 sq. ft. of 6-azauracil and nitrogen, respectively. A positive control plot was treated with the equivalent of .9 and 3.6 pounds of nitrogen per 1000 sq. ft. using a fertilizer having a 20-5-5 N, $P_2O_5$ and $K_2O$ ratio. The applications were made with a granular applicator to dry turf maintained at a 1½ inches mowing height and on a good watering program. Prior to treatment the turf had been on a very low fertility program.

The results are tabulated below:

| Chemical Treatment | | Height (cms.) | | | Clipping Fresh Weight (grams) | | |
|---|---|---|---|---|---|---|---|
| 6-azauracil, pounds per acre | Nitrogen, pounds per 1,000 sq. ft. | Days After Initial Treatment | | | | | |
| | | 11 | 22 | 35 | 11 | 22 | 35 |
| 0 | 0 | 6 | 7 | 6 | 4 | 7 | 3 |
| 0 | .9 | 7 | 9 | 8 | 22 | 17 | 18 |
| 1 | .9 | 6 | 6 | 7 | 4 | 7 | 6 |
| 0 | 3.6 | 8 | 11 | 10 | 20 | 33 | 21 |
| 4 | 3.6 | 6 | 6 | 8 | 4 | 4 | 8 |

As shown by the foregoing table, vertical growth of the treated turf was partially or completely suppressed by application of the 6-azauracil-fertilizer combination, and the weight of clippings removed was materially reduced.

MORPHOLOGICAL MODIFICATIONS

As shown by the following examples, turfs treated in accord with the present invention exhibit marked morphological modifications.

Example XII

Figure 1:
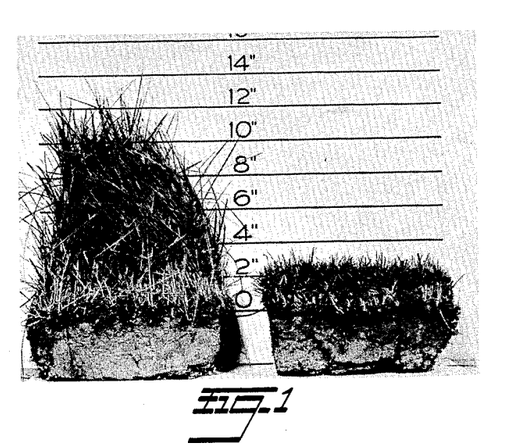
FIGURE 1 shows the difference in vertical growth between a sample of Classic® turf on the left which was maintained on a high fertility program as described in Example XII but otherwise not treated and a sample of Classic® turf on the right treated in accord with the principles of the present invention.
Figure 2:
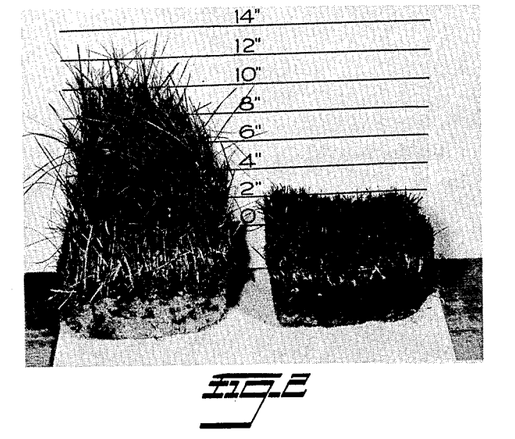
FIGURE 2 shows the two turf samples of FIGURE 1 from a slightly different angle to better illustrate the improvement in turf quality resulting from treatment in accord with the principles of the present invention.

Referring to FIGURES 1 and 2 of the drawing, Classic® bluegrass turf maintained on a high fertility program (5.4 pounds nitrogen, 1.64 pounds of $P_2O_5$ and 1.64 pounds of $K_2O$ per 1000 sq. ft. per year) was treated with 6-azauracil four times at the rate of 8 pounds per acre in a period of approximately 13 months with two applications being made in successive springs at approximately 5 and 6 week intervals, respectively. The turf was moved two weeks before the fourth application at a 2 inch height. The photographs of FIGURES 1 and 2 were taken 37 days after this mowing. The turf treated with 6-azauracil in accord with the principles of the present invention (right in both figures) is of excellent turf quality and color and does not require mowing. In contrast, the control (left) requires mowing and does not have good quality.

Example XIII

To further illustrate the morphological changes produced in turfs by treating them in accord with the principles of the present invention, field grown Classic® bluegrass and K-31 tall fescue maintained on a high fertility program as described in Example VII were treated with 6-azauracil at the rate of 8 pounds per acre as a liquid spray containing 99.303% water, 0.499% Tween 20, and 0.198% 6-azauracil. Detailed measurements (tabulated below) were taken 66 days after the application of the 6-azauracil.

| | Plant Count (No./sq. in.) | | Height Growth Inhibition, percent [a] | | Width Leaf Blade (mm.) | | Clippings Fresh Weight (lbs./1,000 sq. ft.) | |
|---|---|---|---|---|---|---|---|---|
| 6-azauracil, lbs./acre | 0 | 8 | 0 | 8 | 0 | 8 | 0 | 8 |
| Classic bluegrass | 24 | 36 | 0 | 55 | 1.8 | 1.5 | 58 | 16 |
| K-31 tall fescue | 10 | 34 | 0 | 50 | 4.3 | 2.7 | 134 | 37 |

[a] As compared to zero level of 6-azauracil.

As shown by the tabulated data, turf density (plant count) of Classic® bluegrass and K-31 tall fescue was dramatically improved with an associated decrease in vertical growth and clipping removal (fresh weight). The blade width of the Classic® bluegrass was slightly reduced, and the leaf width of the K-31 tall fescue was reduced substantially, resulting in a turf texture which resembled bluegrass, another important benefit obtained by treating coarse bladed turfs in accord with the principles of this invention.

TURF RECOVERY FROM 6-AZAURACIL-FERTILIZER TREATMENT

Example XIV

One of the disadvantages of most plant growth regulators is that the recovery of turfs from the application of such regulators is erratic with new shoots of grass being spindly and chlorotic and elongating rapidly. Moreover, the turf may exhibit only a 5-10% density of new shoots when recovery first becomes evident; and this results in a turf having a ragged, unkempt appearance. These disadvantages are eliminated by the simultaneous application of fertilizer and 6-azauracil or the application of 6-azauracil to a highly fertilized turf in accordance with the principles of this invention.

To demonstrate the uniform recovery of turf from treatments made according to the present invention, Classic® bluegrass turf was treated with a granular formulation containing 97.22% fertilizer (4-1-1 N, $P_2O_5$, and $K_2O$ ratio), Tween 20 (0.466%), hexylene glycol (1.805%), and 6-azauracil (0.508%) at the rates of .9 and 3.6 pounds per 1000 sq. ft. of nitrogen and 1 and 4 pounds per acre of 6-azauracil. Control plots were treated with fertilizer only.

As shown by the data tabulated below, four weeks after treating it with the combination product the turf exhibited excellent color and density with an associated reduction in vertical growth response and clippings removed. As the biological effect of the formulation decreased, turf recovery from inhibition was very uniform as illustrated by improved color, density, and clipping removal during the 9 to 11 week period after treatment.

| 6-azauracil, pounds per acre | Nitrogen, pounds per 1,000 sq. ft. | Color, percent [a] | | Height (cms.) | | Density, percent [a] | | Gms. Clipping Fresh Weight | |
|---|---|---|---|---|---|---|---|---|---|
| | | Days After Initial Treatment | | | | | | | |
| | | 35 | 75 | 35 | 75 | 35 | 75 | 35 | 63 |
| 0 | 0 | 100 | 100 | 6 | 5 | 100 | 100 | 3 | 4 |
| 0 | .9 | 129 | 166 | 8 | 6 | 143 | 100 | 18 | 9 |
| 1 | .9 | 129 | 175 | 7 | 6 | 143 | 140 | 6 | 13 |
| 0 | 3.6 | 180 | 225 | 10 | 7 | 208 | 160 | 21 | 29 |
| 4 | 3.6 | 160 | 250 | 8 | 10 | 186 | 200 | 8 | 37 |

[a] Values are given in percentage of the zero level of 6-azauracil and nitrogen.

REDUCTION OF NUTRITIONAL REQUIREMENTS IN OBTAINING IMPROVED COLOR

Example XV

The combined application of nitrogen containing fertilizer and 6-azauracil in accordance with the principles of this invention produces turfs of improved color in comparison to turfs treated with fertilizer alone even though less nitrogen is supplied to the turf in the combination than is supplied when fertilizer alone is used. In other words, the synergistic combination of fertilizer and 6-azauracil of the present invention is effective in lowering the nutritional requirements of plant species.

To demonstrate this important advantage of the present invention, Windsor bluegrass was sown in 99.9% pure silica sand. After the Windsor was established, the sand was removed from the roots and the grass placed in a standard Hoagland solution No. 1 modified to obtain either 52 or 420 p.p.m. nitrogen. 6-azauracil was then added to the nutrient solution in concentrations of .232 and 5.8 p.p.m. As shown by the data tabulated below, the turf color of the plants to which the 6-azauracil was applied was better at both nitrogen levels than that of the control plants, which received fertilizer only. The difference, however, was more evident at the lower nitrogen concentration. Turf color of plants maintained at the low nitrogen level in the presence of 6-azauracil closely resembled that of those plants treated with the high nitrogen level in the absence of 6-azauracil.

| | Nitrogen Level (p.p.m.) | | | |
|---|---|---|---|---|
| | 52 | 420 | 52 | 520 |
| | Percent Color [a] | | | |
| | 7 Days after Application | | 16 Days after Application | |
| 6-azauracil (p.p.m.): | | | | |
| 0 | 100 | 170 | 100 | 172 |
| 0.232 | 155 | 191 | 142 | 200 |
| 5.800 | 160 | 211 | 150 | 190 |

[a] Values are given in percentages of the zero level of 6-azauracil and 52 p.p.m. nitrogen.

BROAD SPECTRUM ACTIVITY OF TURF SPECIES

As shown by the data tabulated in a number of the foregoing examples, the beneficial results of the present invention can be realized on a variety of turf species. The following examples further illustrate the broad spectrum of activity of the novel compositions disclosed herein.

Example XVI 6-azauracil was applied to various turf species maintained on a high fertility program as described in Example VII. The rate of 6-azauracil applied varied from 1 to 6 pounds per acre. The chemical was applied to foliage in granular formulations and in liquid sprays. The results of these tests are tabulated below.

| Turf Species | Pounds of 6-azauracil per acre | Type of Formulation | Blade Inhibition, Percent | Blade Injury, Percent |
|---|---|---|---|---|
| Common Kentucky bluegrass | 6 | Granular (F-1742) | 30 | 10 |
| Merion Kentucky bluegrass | 6 | do | 55 | 3 |
| Classic ® bluegrass | 1 | do | 58 | 0 |
| K-31 tall fescue | 1 | Granular (F-1788) | 52 | 0 |
| Chewings red fescue | 1 | do | 60 | 0 |
| Astoria bentgrass | 1 | do | 77 | 0 |
| St. Augustine | 1 | Foliar Spray [a] | 32 | 0 |
| Bermuda | 1 | do.[a] | 45 | 0 |
| Centipede | 2 | do.[b] | 38 | 8 |
| Dichondra | 1 | do.[a] | 25 | 5 |

[a] 98.98% water, 0.5% Tween 20, 0.5% acetone, and 0.02% 6-azauracil.
[b] 98.96% water, 0.5% Tween 20, 0.5% acetone, and 0.04% 6-azauracil.

As shown by the foregoing table, representative turf species responded favorably when treated with 1 to 6 pounds per acre of 6-azauracil. Growth inhibition of the blades ranged from 25 to 77% with dichondra exhibiting the least response and Astoria bentgrass exhibiting the most response.

EFFECTIVE RANGE OF ACTIVITY

The preceding examples illustrate that 6-azauracil application rates of from 1 to 12 pounds per acre are effective to produce the beneficial results discussed previously. As shown by the following example, however, optimum application rates of 6-azauracil may vary beyond these limits for particular species with rates as low as 0.1 pound per acre being effective for certain species.

Example XVII 6-azauracil or its sodium salt were applied as a foliar spray (distilled water containing, in addition to 0.002739, 0.013695, 0.02739, or 0.13695% of the active ingredient, 0.5% Tween 20 and approximately 1.0% acetone) to deliver 0.1, 0.5, 1.0, and 5.0 pounds per acre respectively to turf placed in plastic pots. The turf was placed in the greenhouse during the test period. Previously the turf had been maintained on the equivalent of 5.4 pounds of nitrogen per 1000 square feet per year by applying Turf Builder® (23-7-7 N, $P_2O_5$ and $K_2O$ analysis).

Bluegrass and tall fescue were treated with the sodium salt of 6-azauracil, and Bermuda and St. Augustine were treated with 6-azauracil. The following observations were made 32 days after the application of the growth regulating agent:

| Turf Species | Pounds per acre | Observations | |
|---|---|---|---|
| | | Percent Blade Inhibition | Percent Blade Injury |
| Classic bluegrass | 0.1 | 0 | 0 |
| | 0.5 | 33 | 0 |
| | 1.0 | 48 | 0 |
| | 5.0 | 65 | 15 |
| Tall fescue | 0.1 | 21 | 0 |
| | 0.5 | 37 | 0 |
| | 1.0 | 27 | 0 |
| | 5.0 | 42 | 10 |
| Bermuda | 0.1 | 36 | 0 |
| | 0.5 | 50 | 0 |
| | 1.0 | 43 | 0 |
| | 5.0 | 71 | 20 |
| St. Augustine | 0.1 | 8 | 0 |
| | 0.5 | 32 | 0 |
| | 1.0 | 37 | 0 |
| | 5.0 | 74 | 30 |

Rates as low as 0.1 to 0.5 pound per acre of 6-azauracil were effective in inhibiting blade elongation of the more common turf species grown in the Northern and Southern areas of the United States. Higher rates of 1 to 5 pounds per acre improved the degree of inhibition slightly for tall fescue, moderately for bluegrass, and dramatically for Bermuda and St. Augustine.

REDUCTION IN MOISTURE REQUIREMENTS OF TURF SPECIES

As discussed above, another benefit realized from the present invention is that the application of fertilizer and 6-azauracil to turf in accord with the principles of this invention reduces the moisture requirements of the turf. The extent to which moisture requirements are reduced is shown by the following examples.

Example XVIII

Windsor Kentucky bluegrass pots were sprayed with the sodium salt of 6-azauracil at the rate of 2 pounds per acre employing a formulation containing 99.449% water, 0.500% Tween 20, and 0.051% of the sodium salt of 6-azauracil, which was prepared as described in Example XXIV. Subsequently, all pots were subirrigated to obtain a wet weight of 752 grams. Wet weights were recorded periodically to determine the rate of evapotranspiration from the pots. The results are tabulated below:

| Days After Subirrigation | 2 | 5 |
|---|---|---|
|  | Percent Reduction in Evapotranspiration | |
| 6-azauracil, pounds per acre: |  |  |
| 0 | 0 | 0 |
| 2 | 12 | 20 |

As shown by this data, Windsor Kentucky bluegrass seedlings treated with 6-azauracil at the rate of 2 pounds per acre exhibited a 20% reduction in evapotranspiration in comparison with the control.

Example XIX

Windsor Kentucky bluegrass was placed in Hoagland solution No. 1 of varying nitrogen and 6-azauracil content. The nitrogen content of the Hoagland solution was modified to 52 and 420 p.p.m. and the 6-azauracil adjusted to 0.2 and 5.8 p.p.m. At the end of three and six days water was added to restore the solution to its original volume.

As shown by the data tabulated below, evapotranspiration of Windsor bluegrass turf was reduced by 23 to 52% in the presence of 6-azauracil at 0.2 to 5.8 p.p.m. compared to the control. The percent reduction in evapotranspiration was comparable irrespective of nitrogen level.

|  | Percent Reduction in Evapotranspiration | |
|---|---|---|
| Nitrogen (p.p.m.) | 52 | 420 |
| 6-azauracil (p.p.m): |  |  |
| 0 | 0 | 0 |
| 0.2 | 23 | 27 |
| 5.8 | 52 | 47 |

This data is particularly significant in that it shows that the presence of available nitrogen does not reduce the ability of 6-azauracil to lower the rate of evapotranspiration of water from turf species.

METHODS OF APPLICATION AND CARRIERS

As suggested above, the 6-azauracil of the present invention can be applied in formulations in which it is combined with a nitrogen containing fertilizer or in a separate formulation, and the formulations can be of the granular type or sprays or drenches (or, if desired, other types of formulations such as dusts or the like may be used). The formulations can be applied to either dry or moist turf. The following example shows typical formulations and the results they produce.

Example XX

The 6-azauracil formulations tabulated below were applied to Classic® bluegrass turf under field conditions using various carriers. The materials were applied to dew moistened and dry turf. The turf was maintained on a good fertility program (5.4 pounds of nitrogen per 1000 square feet per year) prior to treatment.

| Ingredients | Code Number [a] | | | |
|---|---|---|---|---|
|  | F-2030 | F-2031 | F-2032 | F-1742 |
| 20-5-5 | 97.41 | 98.05 | 95.73 |  |
| UF Resin |  |  |  |  |
| Vermiculite |  |  |  | 89.41 |
| Water |  |  |  |  |
| Ethylene Glycol |  |  |  |  |
| Hexylene Glycol | 1.63 | 1.22 | 2.85 | 3.25 |
| Tween 20 | 0.50 | 0.50 | 0.50 | 0.50 |
| 6-azauracil | 0.46 | 0.23 | 0.92 | 1.83 |
| Acetone |  |  |  | 5.01 |

| Ingredients | Code Number [a] | | | | |
|---|---|---|---|---|---|
|  | F-1787 | F-1788 | 4-153-1A | 4-153-1B | A-1096 |
| 20-5-5 | 97.22 |  |  |  |  |
| UF Resin |  |  | 1.80 | 1.36 |  |
| Vermiculite |  | 98.91 | 84.25 | 84.25 |  |
| Water |  |  | 2.05 | 2.05 | 98.4 |
| Ethylene Glycol |  |  | 6.73 | 6.73 |  |
| Hexylene Glycol | 1.81 |  |  |  |  |
| Tween 20 | 0.47 | 0.57 |  |  | 0.50 |
| 6-azauracil | [b] 0.51 | 0.51 | [b] 0.33 | [b] 0.33 | 0.10 |
| Acetone |  |  |  |  | 1.0 |

[a] All constituents are indicated as percent of total weight.
[b] Sodium salt.

The treated turf was cut weekly, and clippings were removed and weighed during the 4th week after the applications. The following observations were made of the treated turf.

|  |  |  | Dew Moistened Turf | | Dry Turf | |
|---|---|---|---|---|---|---|
| Formulation or Code Number | 6-azauracil, pounds per acre | Nitrogen, pounds per 1,000 sq. ft. | Clipping Removal, Percent Inhib.[b] | Injury, Percent [b] | Clipping Removal, Percent Inhib.[b] | Injury Percent [b] |
| F-2030 | 1.0 | 1.0 |  |  | 70 | 0 |
| F-2031 | 1.0 | 2.0 |  |  | 60 | 0 |
| F-2032 | 2.0 | 1.0 |  |  | 72 | 0 |
| F-1742 | 4.0 | 0 | 61 | 0 | 56 | 0 |
| F-1787 | 4.0 | 3.6 |  |  | 80 | 0 |
| F-1788 | 1.0 | 0 |  |  | 31 | 0 |
| 4-153-1A | 6.0 | 0 |  |  | 69 | 0 |
| 4-153-1B | 6.0 | 0 |  |  | 65 | 0 |
| A-1096 | 6.0 | 0 |  |  | [a] 73 | 0 |
| A-1096 | 5.0 | 0 | 65 | 0 |  |  |

[a] Applied as a foliar spray and drenched in immediately.
[b] Percent based on untreated plots.

6-azauracil applied as a liquid foliar spray or root drench or in granular form to dry or moist turf is effective in inhibiting the rate of vertical growth of Classic® bluegrass. The dry carriers may range from a complete fertilizer formulation to a vermiculite dispersing agent. Unless the turf is on a high fertility program, the nitrogen containing fertilizer is preferably applied at the same time as the 6-azauracil to obtain the other benefits of the present invention such as improvement in turf quality discussed above.

The following illustrates the methods of preparing the formulations referred to in the various samples illustrating the different aspects of the present invention:

Example XXI

Formulation No. 4-153-1A: 140.78 grams of urea, 153.00 grams of urea-formaldehyde and 15.00 grams of water were stirred together for one hour in a heated water bath at 55° C. to produce a urea-formaldehyde resin in a 1:1 ratio. 1.329 grams of 6-azauracil sodium salt monohydrate was dissolved in 26.64 grams of the resultant resin.

The solution was solidified by the addition of 4 milliliters of 15% sulfuric acid, cured in an oven for 2 hours at 60° C., then ground to pass through a U.S. 70 mesh screen. 283 grams of vermiculite were combined with the granular U/F-6-azauracil mixture. Onto this combination 22.60 grams of ethylene glycol and 6.88 grams of water were sprayed to aid agglomeration.

Example XXII

Formulation No. F-2030: 200 milliliters of hexylene glycol was blended with 56.6 grams of polyoxyethylene sorbitan monolaurate (currently available as "Tween 20" from Atlas Chemical Industries). To this mixture 52.1 grams of 6-azauracil were added, and blending was continued until a suspension was formed. The resulting suspension was sprayed onto 24.37 pounds of 20.55–5.13–5.13 (N-$P_2O_5$-$K_2O$ analysis) fertilizer prepared as described in U.S. Patent 3,076,700, Fertilizer Compositions and Process, to form a granular material having a final N-$P_2O_5$-$K_2O$ analysis of 20-5-5.

Example XXIII

Formulation No. F-1742: 720 milliliters of acetone and 400 milliliters of hexylene glycol were blended with 56.8 grams of polyoxyethylene sorbitan monolaurate (currently available as "Tween 20" from Atlas Chemical Company). 208 grams of 6-azauracil was added to the above mixture and further blended until a suspension was formed. The resulting suspension was sprayed onto 4500 cu. in. of No. 4 expanded vermiculite to form a granular, dust-free composition.

Example XXIV

Soil drench of Example II: 1.67 milliliters of acetone and 0.5 milliliter of polyoxyethylene sorbitan monolaurate (currently available as "Tween 20" from Atlas Chemical Industries) were blended together. To this mixture 4 milligrams of 6-azauracil was added and further blended until a suspension was formed. For effective distribution the suspension was diluted with 97.83 milliliters of water and applied as a drench.

Other of the formulations described herein may of course be similarly formulated.

As will be obvious to those skilled in the arts to which this invention relates, the proportions of the ingredients in the various formulations disclosed herein may be varied for various applications of the present invention. The following table lists the preferred proportions of ingredients for the various types of formulations disclosed herein:

| Type of Formulation | Ingredients | Range (Parts by Weight) |
|---|---|---|
| Foliar Spray or Soil Drench | Carrier (water) | 50,000 |
| | Surfactant [b] | 56-661 |
| | Solvent | 0-5,572 |
| | 6-azauracil or derivative | 1-361 |
| Granular growth regulator—Fertilizer combined product. | Carrier (20-5-5 fertilizer) | 5,000 |
| | Solvent [a] | 60-150 |
| | Surfactant [b] | 20-30 |
| | 6-azauracil or derivative | 1-50 |
| Granular growth regulator product, inert carrier. | Carrier (vermiculite) | 5,000 |
| | Solvent [a] | 180-1,830 |
| | Surfactant [b] | 30-130 |
| | 6-azauracil or derivative | 2-100 |
| | Water | 0-200 |
| Granular growth regulator—Fertilizer combined product, inert carrier. | Carrier (vermiculite) | 5,000 |
| | Urea-Formaldehyde Resin | 80-110 |
| | Water | 120 |
| | Solvent [a] | 400 |
| | 6-azauracil or derivative | 2-20 |

[a] The "solvent" may include or be a sticking agent such as ethylene or hexylene glycol or another of the sticking agents disclosed in U.S. Patents Nos. 3,076,699 and 3,083,089.

[b] It is not necessary that the specific surfactant mentioned herein be employed in the practice of the present invention. Other suitable surfactants are commercially available and can be employed, if desired. See, for example, "Detergents and Emulsifiers Up to Date 1962" by John W. McCutcheon, Inc., 236 Mt. Kemble Ave., Morristown, N.J. which is hereby incorporated herein by reference.

Numerous formulations falling within these categories have been described previously. Other examples are:

| Formulation number | Ingredients | Parts by weight |
|---|---|---|
| F-1930 | Vermiculite | 500 |
| | $H_2O$ | 20 |
| | Hexylene Glycol | 27 |
| | Tween 20 | 3 |
| | 6-azauracil (sodium salt) | 10 |
| F-1645 | Vermiculite | 500 |
| | Dimethyl Sulfoxide [a] | 183 |
| | Tween 20 | 13 |
| | 6-azauracil | 2 |

[a] Solvent for 6-azauracil.

SOIL MOBILITY

It has been found by the inventors that an important benefit of utilizing 6-azauracil to regulate the vertical growth of turf species in accordance with the principles of the present invention is that it has a low degree of mobility in soil as illustrated by the following example and a high degree of residuality as previously illustrated. Low mobility is important because: (1) the active ingredient will not move downward in the soil to which it is applied to a depth where it will not reach the plant roots; and (2) it will not spread to areas adjacent those to which it is applied.

Example XXV

Glass columns were filled with a 3-1-1 loam-peat-sand mixture, and water was added until field capacity (27.7% water for the soil used) was obtained (field capacity is, in the case of water, the percentage of water by weight which a given soil will retain after the free water is drained off). 6-azauracil (formulation F-1742) was applied to the columns at rates of 0, 2, 4, 8 and 16 pounds per acre. Twenty-four hours atfer applying the 6-azauracil, 2 inches of water was added to each column. When field capacity was obtained, the soil columns were removed and sliced into 1-inch sections. The cores were sown with Windsor Kentucky bluegrass. The total germination was recorded 21 days after seeding and is tabulated below:

| | Percent Germination [a] | | | | |
|---|---|---|---|---|---|
| Soil Depth (Inches) | 0 to 1 | 1 to 2 | 2 to 3 | 3 to 4 | 4 to 5 |
| 6-azauracil, pounds per acre: | | | | | |
| 2 | 63 | 118 | 109 | 138 | 105 |
| 4 | 35 | 122 | 94 | 124 | 100 |
| 8 | 15 | 69 | 111 | 90 | 114 |
| 16 | 28 | 10 | 72 | 72 | 94 |

[a] Percentages based on germination in untreated soil.

DERIVATIVES OF 6-AZAURACIL

As indicated above, derivatives of 6-azauracil may be substituted for this chemical in the practice of the present invention. The effectiveness of such compounds is illustrated by the following examples:

Example XXVI

Derivatives of 6-azauracil were applied as a foliar spray (F) containing, in addition to the active ingredient, distilled water and 0.5% Tween 20 at rates of 1 and 10 pounds per acre respectively or as a soil drench (D) at a rate of 10 pounds per acre to turfs of different species. The turf was placed in the greenhouse and was maintained on a high fertility program as described in Example VII. Readings recorded 4 weeks after treatment are tabulated below:

Example XXVIII

Common Kentucky bluegrass and annual bluegrass were sprayed at the rate of 1 and 5 pounds per acre of 5-bromo-6-azauracil in a formulation of the type described in Example XXIV 3 weeks after sowing.

As shown by the data recorded 32 days after treatment and tabulated below, tillering of Kentucky bluegrass and annual bluegrass was substantially increased by the 5-bromo-6-azauracil at the lower rate for both species and at the higher rate for Kentucky bluegrass. Associated with the increase in tillering was a reduction in the height growth response of 54% to 80%. Plant survival was excellent at all rates.

| 6-azauracil Derivatives | Pounds per acre | Method | Bluegrass Inj., percent | Bluegrass Inhib., percent | K-31 Fescue Inj., percent | K-31 Fescue Inhib., percent |
|---|---|---|---|---|---|---|
| 6-azauracil Sodium Salt | 1 | F | 0 | 58 | 0 | 52 |
|  | 10 | F | 5 | 54 | 50 | 57 |
|  | 10 | D | 0 | 54 | 0 | 38 |
| 3-methyl-6-azauracil | 1 | F | 0 | 38 | 0 | 24 |
|  | 10 | F | 0 | 46 | 0 | 43 |
|  | 10 | D | 0 | 42 | 0 | 33 |
| 5-bromo-6-azauracil | 1 | F | 0 | 0 | 0 | 24 |
|  | 10 | F | 5 | 58 | 0 | 48 |
|  | 10 | D | 0 | 62 | 0 | 43 |
| 2-thio-6-azauracil | 1 | F | 0 | 38 | 0 | 33 |
|  | 10 | F | 0 | 66 | 5 | 62 |
|  | 10 | D | 0 | 46 | 0 | 53 |
| 5-methyl-2-thio-6-azauracil | 1 | F | 0 | 16 | 0 | 24 |
|  | 10 | F | 0 | 7 | 0 | 14 |
|  | 10 | D | 10 | 7 | 0 | 10 |

| 6-azauracil Derivatives | Pounds per acre | Method | Bermuda Inj., percent | Bermuda Inhib., percent | St. Augustine Inj., percent | St. Augustine Inhib., percent |
|---|---|---|---|---|---|---|
| 6-azauracil Sodium Salt | 1 | F | 25 | 31 | 0 | 32 |
|  | 10 | F | 90 | 59 | 80 | 62 |
|  | 10 | D | 95 | 59 | 30 | 47 |
| 3-methyl-6-azauracil | 1 | F | 0 | 27 | 0 | 29 |
|  | 10 | F | 15 | 40 | 0 | 17 |
|  | 10 | D | 15 | 17 | 0 | 29 |
| 5-bromo-6-azauracil | 1 | F | 0 | 33 | 0 | 17 |
|  | 10 | F | 25 | 53 | 0 | 43 |
|  | 10 | D | 25 | 53 | 0 | 43 |
| 2-thio-6-azauracil | 1 | F | 0 | 27 | 0 | 29 |
|  | 10 | F | 50 | 53 | 0 | 43 |
|  | 10 | D | 30 | 40 | 0 | 57 |
| 5-methyl-2-thio-6-azauracil | 1 | F | 0 | 17 | 0 | 9 |
|  | 10 | F | 0 | 10 | 0 | 17 |
|  | 10 | D | 0 | 10 | 0 | 9 |

As shown by the tabulated data, derivatives of 6-azauracil effectively inhibit vertical growth of a broad group of turf species. In the tests summarized above excellent vertical growth inhibition with no deleterious side effects was realized on all species studied by the application of derivatives of 6-azauracil to turfs in accord with the principles of the present invention.

Example XXVII

Common Kentucky bluegrass and white Dutch clover were sprayer with 6-azauracil derivatives (the sprays were formulated as described in Example XXVI) at the rate of 1 pound per acre 3 weeks after seeding. Vertical growth measurements and the percent of injury were recorded 3 weeks after treating.

| Chemical Treatment Derivatives | Kentucky Bluegrass Blade Inhibition, Percent | Kentucky Bluegrass Blade Injury, Percent | White Dutch Clover Inhibition, Percent | White Dutch Clover Leaf Injury Percent |
|---|---|---|---|---|
| Check | 0 | 0 | 0 | 0 |
| 6-azauracil | 78 | 22 | 66 | 24 |
| 6-azauracil sodium salt | 64 | 9 | 55 | 10 |
| 5-bromo-6-azauracil | 37 | 0 | 28 | 3 |
| 3-methyl-6-azauracil | 48 | 0 | 51 | 0 |
| 2-thio-6-azauracil | 68 | 0 | 54 | 5 |
| 5-methyl-2-thio-6-azauracil | 35 | 0 | 43 | 2 |
| 2-thio-6-azauracil sodium salt | 65 | 16 | 6 | 23 |
| 4-thio-6-azauracil | 77 | 27 | 52 | 20 |

|  | Kentucky Bluegrass Observation | | | |
|---|---|---|---|---|
|  | Plant Survival (Percent) | Blade Length (Centimeters) | Inhibition (Percent) a | Tiller Count per flat |
| 6-azauracil treatment, pounds per acre: | | | | |
| 0 | 100 | 13 | 0 | 17 |
| 1 | 100 | 6 | 54 | 22 |
| 5 | 100 | 3 | 76 | 37 |
|  | Annual Bluegrass Observation | | | |
| 0 | 100 | 10 | 0 | 36 |
| 1 | 100 | 2 | 80 | 71 |
| 5 | 100 | 2 | 80 | 27 | a As compared to zero level of 6-azauracil.

The foregoing data further demonstrates the effectiveness of various derivatives of 6-azauracil for the purposes of the present invention and shows that the efficacy of a particular derivative is apparently dependent on the structure and position in the triazine nucleus of the substitution group or groups.

PLANT COMPOSITION

Example XXIX

One effect that the application of 6-azauracil with nitrogen (or to a highly fertilized turf) has on turf species, which produces the benefits discussed previously, is to markedly increase the nitrogen content of the plant tissue. This is shown by tests in which field grown Classic® bluegrass maintained on a high fertility program as described in Example VII was treated with a liquid spray containing 99.450% water, 0.50% Tween 20, and 0.050% 6-azauracil at a rate of 2 pounds of active ingredient per acre. Clippings were collected 34 days after treatment, dried, and prepared for chemical analysis. The analysis showed the composition of the treated and untreated bluegrass to be as follows:

izer, applying to the mature, intact plants of said turf from about 0.1 to about 16 pounds per acre of a compound having the formula

|  | Percent | | | | | | Parts per million | | | | | | |
|---|---|---|---|---|---|---|---|---|---|---|---|---|---|
| Chemical Treatment | N | P | K | Na | Ca | Mg | Mn | Fe | B | Cu | Mo | Zn | Al |
| 6-azauracil | 3.90 | .39 | 2.25 | .29 | .66 | .30 | 37 | 169 | 26 | 8 | .6 | 28 | 22 |
| Control | 3.03 | .39 | 2.21 | .28 | .68 | .30 | 42 | 180 | 22 | 7 | .6 | 25 | 25 |

The data shows that treatment with a combination of nitrogen and 6-azauracil causes an increase in nitrogen content of the plant tissue. On a basis of relative protein content, plant tissue from plants treated with this combination contains 29 percent more protein than untreated plants. This is important in that it demonstrates the marked ability of the combination of 6-azauracil and nitrogen containing fertilizer disclosed herein to radically alter the composition of the plant life to which it is applied.

This invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. The method of treating a turf composed of mature grass plants to simultaneously increase its quality and reduce its vertical growth rate, comprising the step of applying to the mature, intact plants of said turf a nitrogen supplying fertilizer in a quantity providing from about 0.45 to about 5.4 pounds of nitrogen per 1000 square feet of turf area and from about 0.1 to about 16 pounds per acre of a growth regulating compound having the formula wherein R is oxygen or sulfur, $R_1$ is sodium, hydrogen, or methyl, $R_2$ is oxygen or sulfur, and $R_3$ is hydrogen, bromine, methyl, or phenyl.

2. The method of claim 1, wherein the growth regulating compound is 6-azauracil.

3. The method of claim 1, wherein the growth regulating compound is selected from the group consisting of the sodium and 2-thio sodium salts and the 5-bromo, 3-methyl, 2-thio, 5-methyl-2-thio, and 4-thio derivatives of 6-azauracil.

4. The method of claim 1, wherein said application is repeated after an interval of from 21 to 56 days.

5. The method of treating a turf composed of mature grass plants to simultaneously increase its quality and reduce its vertical growth rate, comprising the steps of:
(a) maintaining said turf on a high fertility program by periodically applying to said turf a nitrogen supplying fertilizer providing from about 0.45 to about 5.4 pounds of nitrogen per year per 1000 square feet of turf area to stimulate the growth of said turf; and
(b) subsequent to the initial application of said fertilizer, applying to the mature, intact plants of said turf from about 0.1 to about 16 pounds per acre of a compound having the formula wherein R is oxygen or sulfur, $R_1$ is sodium, hydrogen, or methyl, $R_2$ is oxygen or sulfur, and $R_3$ is hydrogen, bromine, methyl, or phenyl.

6. The method of treating a turf composed of mature grass plants to simultaneously increase its quality and reduce its vertical growth, comprising the step of applying to the mature, intact plants of said turf a composition comprising a nitrogen supplying fertilizer and a growth regulating compound having the formula wherein R is oxygen or sulfur, $R_1$ is sodium, hydrogen, or methyl, $R_2$ is oxygen or sulfur, and $R_3$ is hydrogen, bromine, methyl, or phenyl, said composition being applied at a rate providing from about 0.45 to about 5.4 pounds of nitrogen per 1000 square feet of turf area to stimulate the growth of said turf and from about 0.1 to about 16 pounds per acre of the growth regulating compound.

7. A composition for treating turf to simultaneously increase its quality and decrease its vertical growth rate, consisting essentially of:

| Ingredient: | Parts by weight |
|---|---|
| Carrier | 5000 |
| Nitrogen supplying fertilizer | 80–110 |
| Growth regulating compound | 2–20 | said growth regulating compound having the formula wherein R is oxygen or sulfur, $R_1$ is sodium, hydrogen, or methyl, $R_2$ is oxygen or sulfur, and $R_3$ is hydrogen, bromine, methyl, or phenyl.

8. The composition of claim 7, wherein said carrier is expanded vermiculite.

9. The composition of claim 7, wherein the nitrogen supplying fertilizer comprises a urea-formaldehyde resin.

10. The composition of claim 7, together with on the order of 400 parts by weight of a solvent comprising a sticking agent for adhering the growth regulating compound to the carrier.

11. A granular, dust-free composition adapted to be applied to turf in conjunction with a nitrogen supplying fertilizer to simultaneously increase the quality and reduce the vertical growth rate of the turf, consisting essentially of:

| Ingredient: | Parts by weight |
|---|---|
| Carrier | 5000 |
| Growth regulating compound | 2–100 | said carrier being a granular material and said growth regulating compound having the formula wherein R is oxygen or sulfur, $R_1$ is sodium, hydrogen, or methyl, $R_2$ is oxygen or sulfur, and $R_3$ is hydrogen, bromine, methyl, or phenyl.

12. The composition of claim 11, together with about 20–30 parts by weight of a surfactant and about 180–1830 parts by weight of a solvent for the growth regulating compound.

13. A composition for treating turf to simultaneously increase its quality and decrease its vertical growth rate, consisting essentially of:

| Ingredient: | Parts by weight |
|---|---|
| Granular nitrogen supplying fertilizer | 5000 |
| Growth regulating compound | 1–50 | said growth regulating compound having the formula wherein R is oxygen or sulfur, $R_1$ is sodium, hydrogen, or methyl, $R_2$ is oxygen or sulfur, and $R_3$ is hydrogen, bromine, methyl, or phenyl.

14. The composition of claim 13, together with 20–30 parts by weight of a surfactant and from 60–150 parts by weight of a solvent for the growth regulating compound.

15. The composition of claim 13, wherein the nitrogen supplying fertilizer comprises a urea-formaldehyde resin.

16. A liquid composition adapted to be applied to turf in conjunction with a nitrogen supplying fertilizer to simultaneously increase the quality and decrease the vertical growth rate of the turf, consisting essentially of:

| Ingredient: | Parts by weight |
|---|---|
| Liquid carrier | 50,000 |
| Surfactant | 56–661 |
| Solvent | 0–5572 |
| Growth regulating compound | 1–361 | said growth regulating compound having the formula wherein R is oxygen or sulfur, $R_1$ is sodium, hydrogen, or methyl, $R_2$ is oxygen or sulfur, and $R_3$ is hydrogen, bromine, methyl, or phenyl.

References Cited

UNITED STATES PATENTS

| 3,074,791 | 1/1963 | Scoles | 71—110 |
| 3,083,089 | 3/1963 | Renner | 71—24 |
| 3,116,994 | 1/1964 | Goenaga. | |
| 3,235,358 | 2/1966 | Soboczenski | 71—110 |

OTHER REFERENCES

Collins et al., "Growth Regulators and Flowering," 2 (1963) CA 60 (pp. 1043–1044) (1964).

West, "Amino Resins" (1964), Modern Plastics Encyclopedia for 1964 41 1A TP 986 A2M5.

LEWIS GOTTS, Primary Examiner

G. HOLLRAH, Assistant Examiner

U.S. Cl. X.R.

71—29, 82, 85, 93; 260—71

PO-1050
(5/69)

UNITED STATES PATENT OFFICE
CERTIFICATE OF CORRECTION

Patent No. 3,462,257      Dated August 19, 1969

Inventor(s) G. R. McVey, et al.

It is certified that error appears in the above-identified patent and that said Letters Patent are hereby corrected as shown below:

Column 1, line 48, change "compoud" to --compound--.

Column 2, line 40, delete "are".

Column 6, line 8    Footnote a, change "espectively" to --respectively--.

Column 7, line 14, change "standards" to --standard--.

Column 7, line 35, change "(89,407%)" to --(89.407%)--.

Column 8, line 17, change "quality" to --quantity--.

Column 8, line 26, after "by" insert --the--.

Column 8, footnote "c" in 1st Table of Ex. VI - after "c" and before "Designates" insert --C--, change "Designates" to --designates--.

Column 9, table should follow "mowing frequency" line 45.

Column 11, line 73, change "moved" to --mowed--.

Column 13, line 66 (2nd table), change "520" to --420--.

Column 14, line 68 - table (2nd) in the second column opposit "tall fescue", change "27" to --37--.

Column 19, line 58, change "sprayer" to --sprayed--.

SIGNED AND
SEALED
APR 28 1970

(SEAL)
Attest:

Edward M. Fletcher, Jr.
Attesting Officer

WILLIAM E. SCHUYLER, JR.
Commissioner of Patents